United States Patent [19]
Tsai

[11] Patent Number: 5,798,849
[45] Date of Patent: Aug. 25, 1998

[54] MULTILEVEL LIGHT SOURCE DEVICE

[75] Inventor: Jem-Tsair Tsai, Hsinchu, Taiwan

[73] Assignee: Mustek Systems Inc., Hsinchu, Taiwan

[21] Appl. No.: 744,215

[22] Filed: Nov. 5, 1996

[51] Int. Cl.⁶ .................. H04N 1/04; H04N 1/00
[52] U.S. Cl. .................. 358/475; 358/497; 358/406
[58] Field of Search .................. 358/483, 475, 358/474, 471, 509, 505, 446, 487, 506, 406, 504, 497; 362/311, 293, 207; 348/370; 355/69, 71, 53, 77; 399/221; 359/227, 599, 888, 891, 370, 371

[56] References Cited

U.S. PATENT DOCUMENTS

| | | | |
|---|---|---|---|
| 4,062,619 | 12/1977 | Hoffman | 359/370 |
| 4,443,835 | 4/1984 | Brëurtigam et al. | 362/311 |
| 4,602,321 | 7/1986 | Bornhorst | 362/293 |
| 4,821,114 | 4/1989 | Gebhardt | 358/509 |
| 4,855,817 | 8/1989 | Watanabe | 358/512 |
| 5,067,028 | 11/1991 | Ogura et al. | 358/474 |
| 5,255,163 | 10/1993 | Neumann | 362/293 |
| 5,303,028 | 4/1994 | Milch | 358/509 |
| 5,535,021 | 7/1996 | Chiang et al. | 358/474 |
| 5,555,106 | 9/1996 | Hsu | 358/512 |
| 5,555,492 | 9/1996 | Feger | 362/293 |
| 5,612,811 | 3/1997 | Aikawa et al. | 359/204 |

FOREIGN PATENT DOCUMENTS 237167  8/1982  Taiwan.

*Primary Examiner*—Edward L. Coles
*Assistant Examiner*—Cheukfan Lee
*Attorney, Agent, or Firm*—Oblon, Spivak, McClelland, Maier & Neustadt, P.C.

[57] ABSTRACT

The present invention is related to a multilevel light source device. The multilevel light source device includes a light source for generating an initial light signal, and a web medium having a plurality of separate light-transmittable zones for receiving the initial light signal and generating a multilevel light signal in response to the initial light signal, wherein the multilevel light signal can be sent to a light-signal processing unit for further processing.

39 Claims, 5 Drawing Sheets

MULTILEVEL LIGHT SOURCE DEVICE

FIELD OF THE INVENTION

The present invention is related to a multilevel light source device, and more particularly to a multilevel light source device which can provide light signals of various intensities simultaneously and which is adapted to be used with an image scanner.

BACKGROUND OF THE INVENTION

The current image scanners transform the image components of a scanned object into components in a voltage form by means of generating a transmitting light signal responsive to the transmission of light through the scanned object or a reflective light signal responsive to the reflection of light from the scanned object, and then transmitting either of the light signals through a charge-coupled device (CCD). The components of the scanned object in a voltage form are outputted to a computer for further processing. It is known to those skilled in the art that a direct light source is used for transmitting the scanned object in a transmission-mode scanner. In this case, light penetrates a glass of high transmittance to obtain a calibrating light signal provided for the intensity calibration of the light, while light penetrates both a glass of high transmittance and a scanned object of low transmittance to obtain a transmitting light signal provided for the scanning of the object. There is a significant difference in intensity between the calibrating and the transmitting light signals so that the hue of the obtained image after scanning tends to be dark, thereby adversely effecting the scanning quality.

There have been measures developed for dealing with the above problem in the prior art. For example, an N. D. filter was used to select proper light signals, or a light-dispersion plate in a trapezoid shape was used to obtain light of various intensities. These methods, however, are still unsatisfactory owing to the following reasons:

1. Although an N. D. filter can select light signals of proper intensities, it is too costly to meet the requirement of economic interests; and
2. Although a light-dispersion plate 1 in a trapezoid shape (referring to FIG. 1 which is adopted from ROC Patent Publication No. 237,167) can obtain light of various intensities, it is difficult to be integrally manufactured in practice because the thickness of a light-dispersion plate used in a scanner is only several millimeters. If light-dispersion plates having various dimensions are glued together to from a trapezoid plate 1, it might occur that the light-dispersion plates are not closely and evenly glued. In addition, the adhesive used to glue the plates will influence the color distribution of the light to adversely effect the scanning quality. Of course, many human efforts are required to assemble the plate 1 in this case.

SUMMARY OF THE INVENTION

Therefore, a primary object of the present invention is to provide a multilevel light source device which can provide light signals of various intensities simultaneously.

Another object of the present invention is to provide an image scanner having a multilevel light source device which can provide light signals of various intensities simultaneously.

A further object of the present invention is to provide a cost-effective and easily assembled multilevel light source device.

Still another object of the present invention is to provide a multilevel light source device emitting light of uniform intensity.

For the above purposes, the present inventors contemplate a multilevel light source device which includes a light source for generating an initial light signal, and a web medium having a plurality of light-transmittable zones separately located thereon for receiving the initial light signal and generating a multilevel light signal in response to the initial light signal, wherein the multilevel light signal can be sent to a light-signal processing unit for further processing.

Preferably, each of the plurality of light-transmittable zones includes a slot positioned in the web medium, and a light-dispersion plate secured on the slot for receiving the initial light signal and generating the multilevel light signal in response to the initial light signal.

The light-dispersion plates respectively included in each of the plurality of light-transmittable zones can be made of different materials. Alternatively, the light-dispersion plates respectively included in each of the plurality of light-transmittable zones can be made of the same material but have various thicknesses.

In a preferred embodiment, the light-dispersion plate is made of frosted glass.

In another preferred embodiment, the light-dispersion plate is made of plastic.

In another preferred embodiment, the light-dispersion plate is made of acrylic plastic.

Preferably, the plurality of light-transmittable zones are integrally formed with the web medium.

In accordance with another aspect of the present invention, the multilevel light source device preferably further includes a reflection unit arranged around the light source for enhancing the intensity of the initial light signal. The reflection unit can be a reflective plate.

In accordance with another aspect of the present invention, the light-signal processing unit is an image sensing and processing device, and the image sensing and processing device is preferably a charge-coupled device (CCD).

In accordance with another aspect of the present invention, the multilevel light source device is used with an image scanner, and the image scanner is preferably a light-transmitting image scanner.

The present inventors also contemplate an image scanner having a multilevel light source device which includes a light source for generating an initial light signal, a web medium having a plurality of light-transmittable zones separately located thereon for receiving the initial light signal and generating a multilevel light signal in response to the initial light signal, wherein the multilevel light signal can be sent to an object to be scanned to produce a scanned object light signal, and an image sensing and processing device for processing the multilevel light signal and the scanned object light signal.

In accordance with another aspect of the present invention, each of the plurality of light-transmittable zones includes a slot positioned in the web medium, and a light-dispersion plate secured on the slot for receiving the initial light signal and generating the multilevel light signal in response to the initial light signal.

The light-dispersion plates respectively included in each of the plurality of light-transmittable zones can be made of different materials. Alternatively, the light-dispersion plates respectively included in each of the plurality of light-transmittable zones can be made of the same material but have various thicknesses.

Preferably, the light-dispersion plate is made of frosted glass, plastic or acrylic plastic.

Preferably, the plurality of light-transmittable zones are integrally formed with the web medium.

The image scanner according to the present invention can further includes a reflection unit arranged around the light source for enhancing the intensity of the initial light signal. The reflection unit can be a reflective plate.

In accordance with another aspect of the present invention, the image sensing and processing device is a charge-coupled device (CCD).

In accordance with another aspect of the present invention, the image scanner is a light-transmitting image scanner.

The present invention will be illustrated in details with reference to the accompany drawings, in which:

DETAILED DESCRIPTION OF THE PREFERRED EMBODIMENTS

Figure 1:
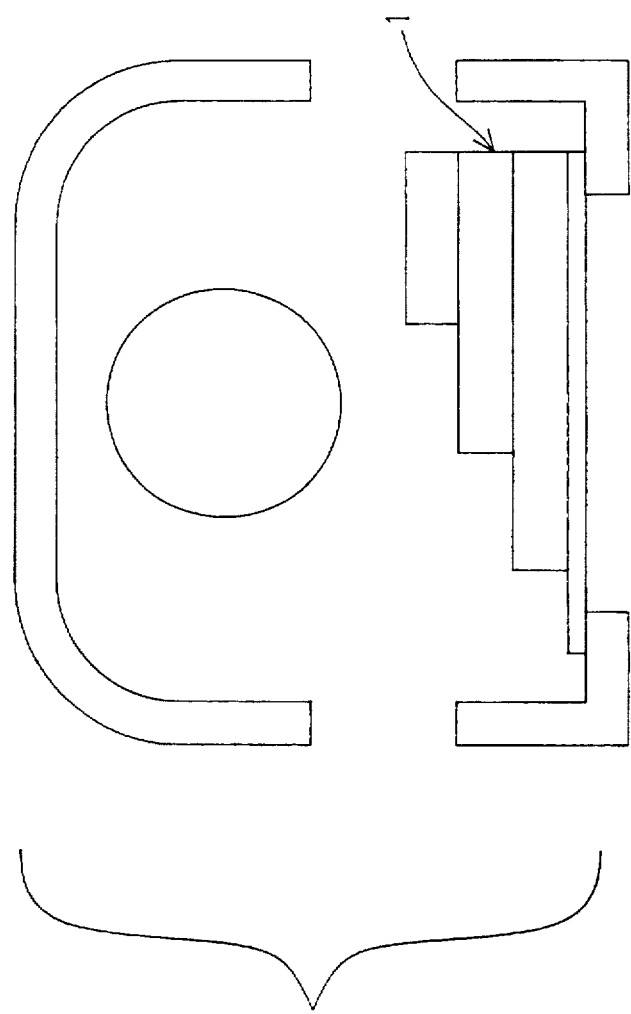
FIG. 1 is a cross-section view of a conventional multilevel light source device.
Figure 2:
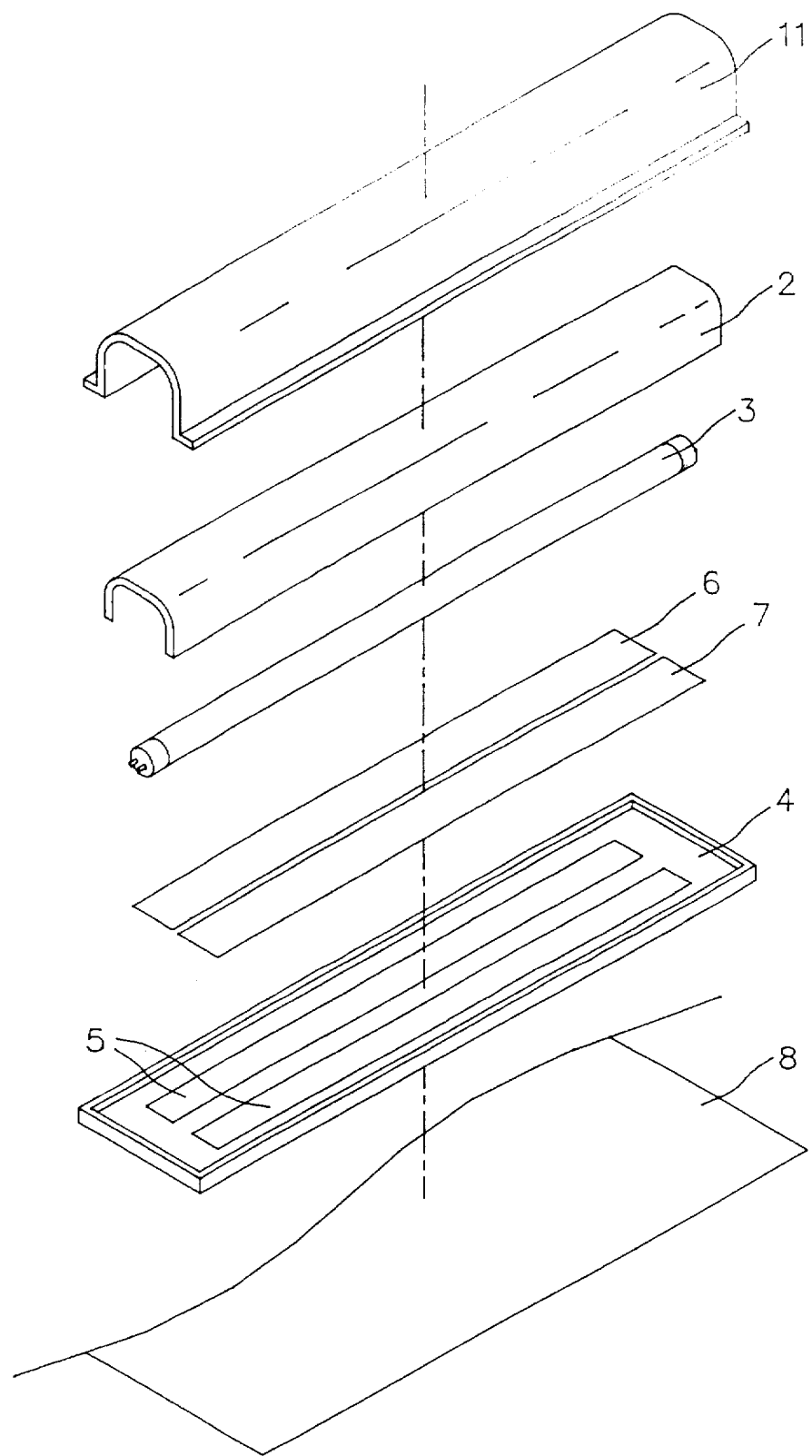
FIG. 2 is a schematic diagram showing the assembling of a preferred embodiment of a multilevel light source device according to the present invention.

The multilevel light source device according to the present invention can be used with an image scanner, and a preferred embodiment of the multilevel light source device according to the present invention is shown in FIG. 2. The elements shown in FIG. 2 include a housing 11, a reflective plate 2, a tubular light 3, a web medium 4 having therein two slots 5, a first light-dispersion plate 6, a second light-dispersion plate 7 and an object to be scanned 8. The reflective plate 2 is arranged around the tubular light 3 to enhance light intensity and to make the initial light signal generated by the tubular light 3 transmit through the light-dispersion plates 6 and 7 more evenly. The present invention is characterized by that the web medium 4 is located between the light source 3 and the object to be scanned 8. The two slots 5 of the web medium 4 secure thereto the light-dispersion plates 6 and 7, a respectively, wherein the light-dispersion plate 6 has relatively low transmittance and the light-dispersion plate 7 has a relatively high transmittance.

Figure 3:
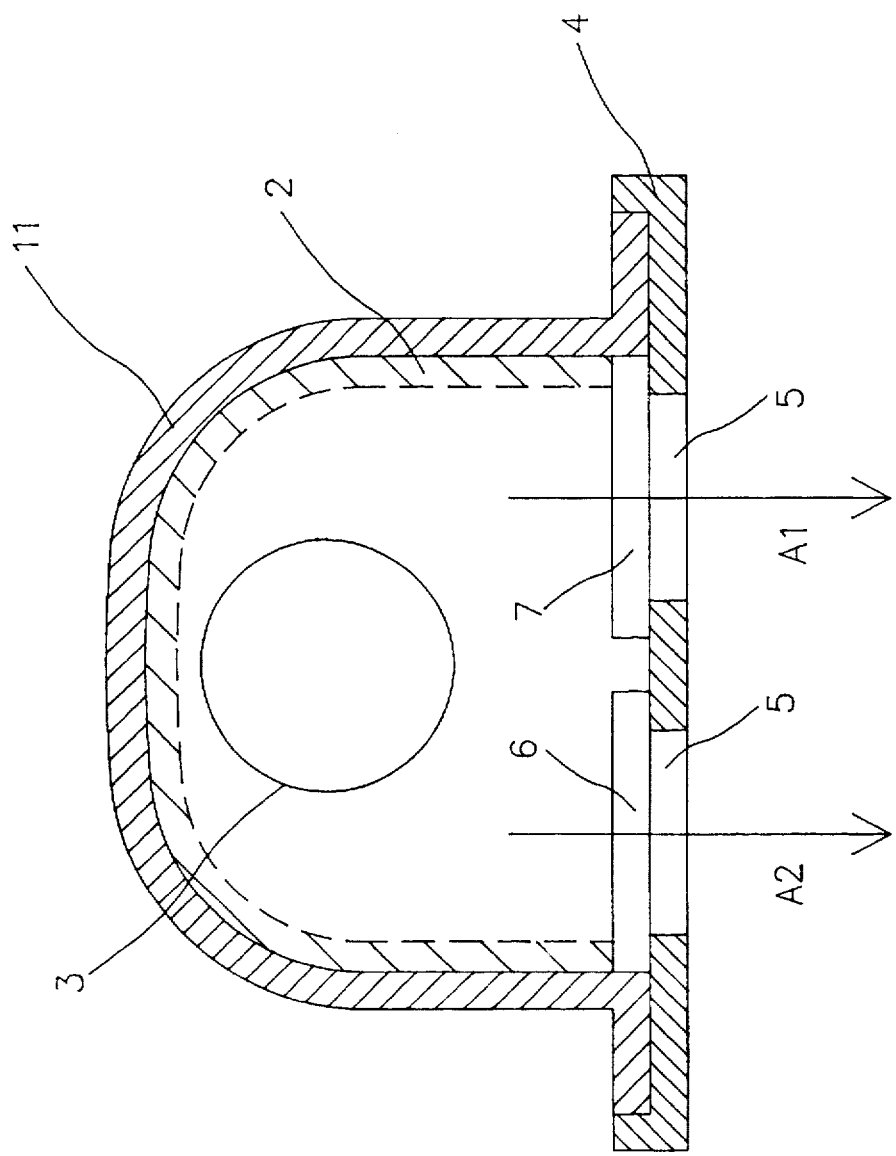
FIG. 3 is a cross-section view of a preferred embodiment of a multilevel light source device according to the present invention.
Figure 4:
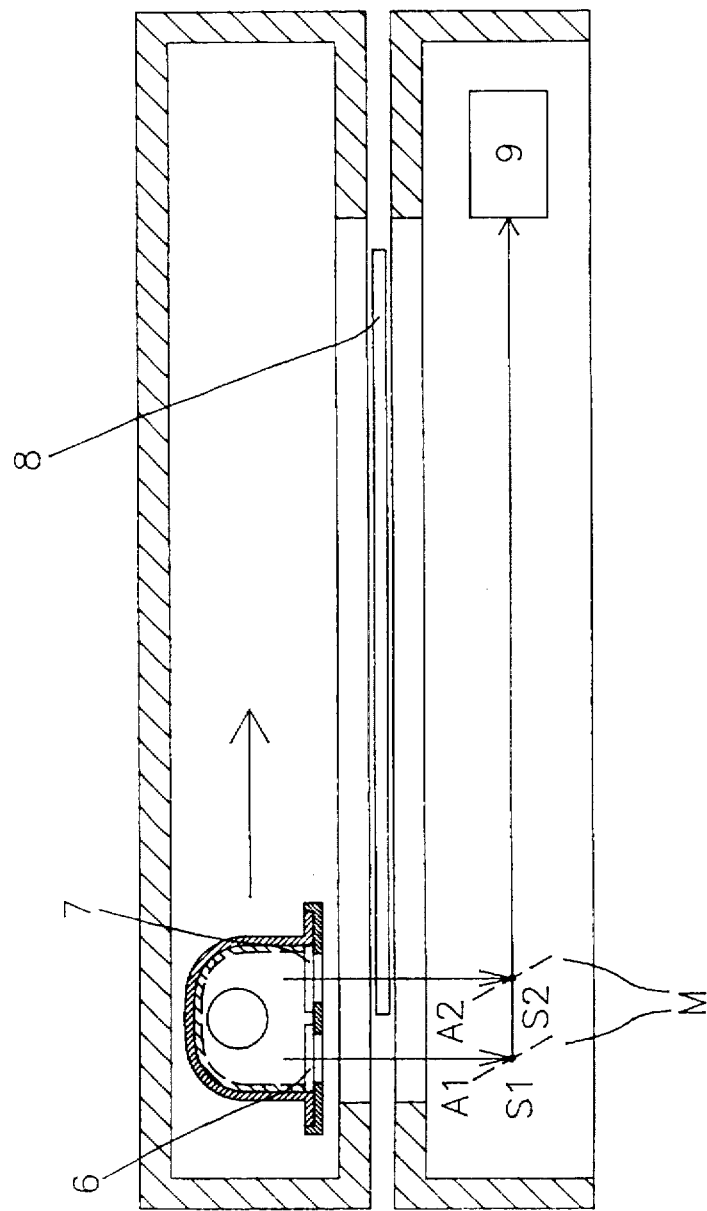
FIG. 4 is a schematic diagram of a preferred embodiment of a multilevel light source device according to the present invention, which is used with a scanner.

Please refer to FIG. 3 which is a cross-section view of the above assembly together with FIG. 4 which shows the present multilevel light source device used with an image scanner. When the initial light signal generated by the light source 3 penetrates through the light-dispersion plates 6 and 7 which have different transmittance, the light signal is divided into two light signals of different intensities, a first light signal A1 through the light-dispersion plate 6 and a second sight signal A2 through the light-dispersion plate 7. By way, obtaining light signals of various intensities can be achieved.

When the image scanner is actuated, the initial light signal is made to penetrate through the light-dispersion plate 6 having a relatively low transmittance first to obtain the light signal A1. The signal A1 is then reflected to a charge-coupled device (CCD) 9 see FIG. 4, as a calibrating light signal by a mirror M moved to a specific location S1 at that time. Afterwards, when a scanning operation is performed, the present multilevel light source device is moved from the starting point to the final point of the scanning path with the shift of the mirror M through the specific locations S2, S3, etc. Meanwhile, the light signal A2 obtained through the light-dispersion plate 7 having a relatively high transmittance is forwarded to and penetrates through the scanned object 8 to obtain a transmitting light signal. The transmitting light signal is then reflected to the CCD 9 by the mirror M, thereby transforming the image components of the object 8 into the signals in a voltage form. The voltage signals can be sent to a computer system for further processing. In brief, low distortion and high quality scanning can be achieved according to the present invention by way of choosing light-dispersion plates 6 and 7 having proper transmittance to make the combined transmittance of the light-dispersion plate 7 and the scanned object 8 close to the transmittance of the light-dispersion plate 6.

Figure 5:
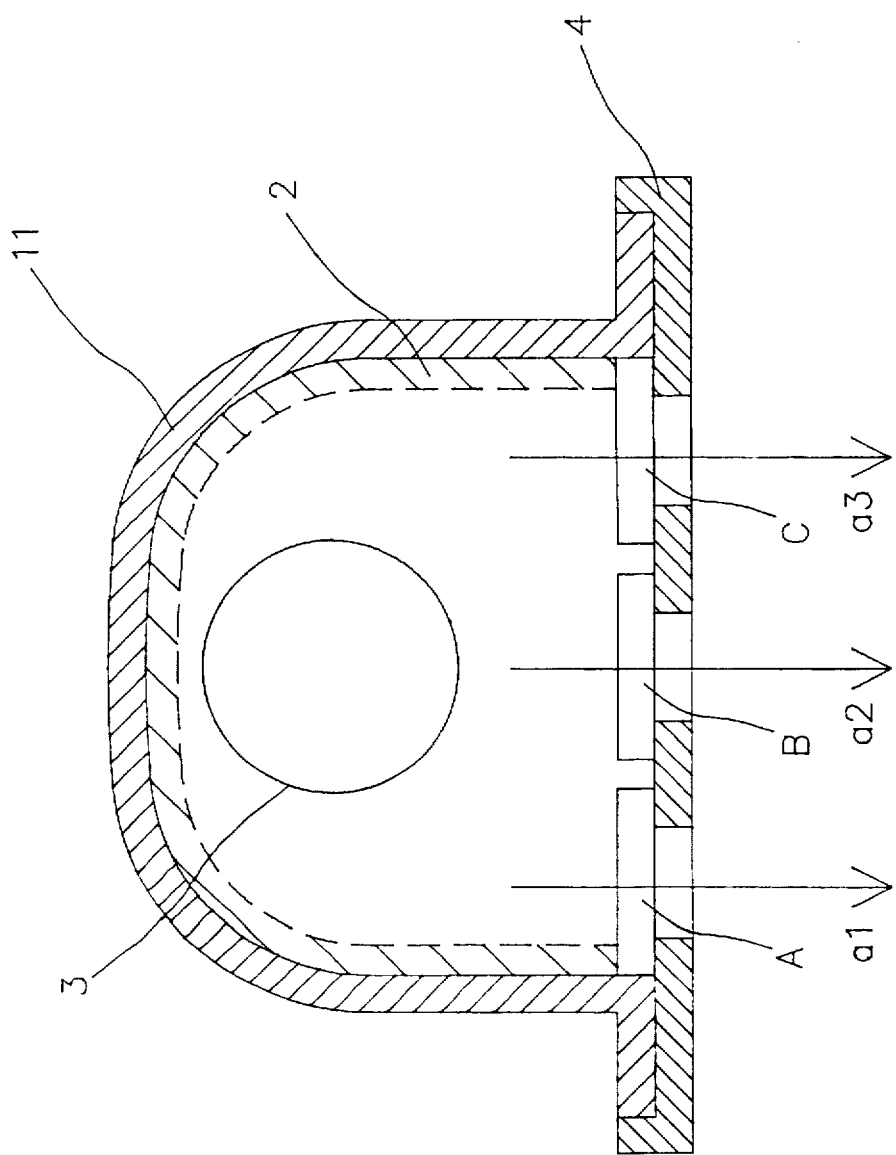
FIG. 5 is a schematic diagram showing the selection of a light-dispersion plate.

In order to have the practice of the present invention realized more clearly, the selection of the light-dispersion plates is exemplarily illustrated with reference to FIG. 5. The elements shown in FIG. 5 include a light-dispersion plate A for calibrating light intensity, which has a transmittance of a %, a light-dispersion plate B for scanning positive films, which has a transmittance of b %, and a light-dispersion plate C for scanning negative films, which has a transmittance of c %. In general, the transmittance of a positive film is about 60% and that of a negative film is about 40%. By the use of the present multilevel light source device, the transmittance of a light signal through the light-dispersion plate A to be the calibrating light signal a1 is a %, the transmittance of a light signal through the light-dispersion plate B and a positive film to be the transmitting light signal a2 is b %×60%, and the transmittance of a light signal through the light-dispersion plate C and a negative film to be the transmitting light signal a3 is c %×40%. If one wants the light source device according to the present invention to have an optimum performance, let a %=b %×60%=c %×40%. In other words, if the plate A is selected to have "a" equal to 36, then the plates B and C are preferred to be selected so as to have "b" equal to 60 and "c" equal to 90, respectively. By this way, both of the calibrating light signal and the transmitting light signal will be 36% of the initial light signal. likewise, if there is any other reflective or transmitting element positioned within the light path of the light signals, the light-dispersion plates can be properly selected in a similar computing manner.

Of course, the transmittance difference of the light-dispersion plates can be made by using light-dispersion plates of different materials or using light-dispersion plates of the same material but different thickness. The light-dispersion plates can be made of frosted glass, plastic or acrylic plastic.

To sum up, the present invention provides a multilevel light source device which can offer light signals having various intensities in a cost-effective and easily manufactured way by using a plurality of different light-dispersion plates.

It should be understood that the scope of the present invention is not limited to the particular embodiment disclosed herein as the best mode contemplated for carrying the present invention. In stead, the scope and the spirit of the present invention are as defined in the appended claims.

What is claimed is:

1. A multilevel light source device, comprising:
   a light source for generating an initial light signal; and
   a web medium having a plurality of separate light-transmittable zones for receiving said initial light signal and generating a multilevel light signal adapted to be sent to a light-signal processing unit in response to said initial light signal, wherein each of said light-transmittable zones disperses a specific ratio of light for all frequencies so as to control an intensity of said initial light signal penetrating therethrough.

2. The multilevel light source device according to claim 1 wherein each of said plurality of light-transmittable zones includes:
   a slot positioned in said web medium; and
   a light-dispersion plate secured on said slot for receiving said initial light signal and generating said multilevel light signal in response to said initial light signal.

3. The multilevel light source device according to claim 2 wherein said light-dispersion plates respectively included in each of said plurality of light-transmittable zones are made of different materials.

4. The multilevel light source device according to claim 2 wherein said light-dispersion plates respectively included in each of said plurality of light-transmittable zones are made of the same material but have various thicknesses.

5. The multilevel light source device according to claim 2 wherein said light-dispersion plate is made of frosted glass.

6. The multilevel light source device according to claim 2 wherein said light-dispersion plate is made of plastic.

7. The multilevel light source device according to claim 2 wherein said light-dispersion plate is made of acrylic plastic.

8. The multilevel light source device according to claim 1 wherein said plurality of light-transmittable zones are integrally formed with said web medium.

9. The multilevel light source device according to claim 1 further comprising a reflection unit arranged around said light source for enhancing the intensity of said initial light signal.

10. The multilevel light source device according to claim 9 wherein said reflection unit is a reflective plate.

11. The multilevel light source device according to claim 1 wherein said light-signal processing unit is an image sensing and processing device.

12. The multilevel light source device according to claim 11 wherein said image sensing and processing device is a charge-coupled device (CCD).

13. The multilevel light source device according to claim 1 wherein said multilevel light source device is used with an image scanner.

14. The multilevel light source device according to claim 13 wherein said image scanner is a light-transmitting image scanner.

15. An image scanner having a multilevel light source device, comprising:
   a light source for generating an initial light signal;
   a web medium having a plurality of separate light-transmittable zones for receiving said initial light signal and generating a multilevel light signal in response to said initial light signal, wherein said multilevel light signal is sent to an object to be scanned to produce a scanned object light signal;
   a light transmission device aligned with a first selected one of said light-transmittable zones during light-intensity calibration for transmitting a portion of said multilevel light signal which has passed through said first selected one of said plurality of separate light-transmittable zones, and aligned with a second selected one of said plurality of separate light-transmittable zones during scanning for transmitting a portion of said scanned object light signal which has passed through said second selected one of said plurality of separate light-transmittable zones; and
   an image sensing and processing device for receiving and processing said multilevel light signal and said scanned object light signal.

16. The image scanner according to claim 15 wherein each of said plurality of light-transmittable zones includes:
   a slot positioned in said web medium; and
   a light-dispersion plate secured on said slot for receiving said initial light signal and generating said multilevel light signal in response to said initial light signal.

17. The image scanner according to claim 16 wherein said light-dispersion plates respectively included in each of said plurality of light-transmittable zones are made of different materials.

18. The image scanner according to claim 16 wherein said light-dispersion plates respectively included in each of said plurality of light-transmittable zones are made of the same material but have various thicknesses.

19. The image scanner according to claim 16 wherein said light-dispersion plate is made of frosted glass.

20. The image scanner according to claim 16 wherein said light-dispersion plate is made of plastic.

21. The image scanner according to claim 16 wherein said light-dispersion plate is made of acrylic plastic.

22. The image scanner according to claim 15 wherein said plurality of light-transmittable zones are integrally formed with said web medium.

23. The image scanner according to claim 15 further comprising a reflection unit arranged around said light source for enhancing the intensity of said initial light signal.

24. The image scanner according to claim 23 wherein said reflection unit is a reflective plate.

25. The image scanner according to claim 15 wherein said image sensing and processing device is a charge-coupled device (CCD).

26. The image scanner according to claim 15 wherein said image scanner is a light-transmitting image scanner.

27. A multilevel light source device, comprising:
   a light source for generating an initial light signal; and
   a web medium having a plurality of separate light-transmittable zones, each of which includes:
      a slot; and
      a light-dispersion plate secured on said slot for receiving said initial light signal and generating a multilevel light signal adapted to be sent to a light-signal processing unit in response to said initial light signal;
   wherein said light-dispersion plates respectively included in said plurality of separate light-transmittable zones are made of different materials.

28. The multilevel light source device according to claim 27, wherein said light-dispersion plates are made of materials selected from a group consisting of frosted glass, plastic and acrylic plastic.

29. The multilevel light source device according to claim 27, further comprising a reflective plate arranged around said light source for enhancing intensity of said initial light signal.

30. The multilevel light source device according to claim 27, wherein said light-signal processing unit is a charge-coupled device (CCD).

31. A multilevel light source device, comprising:

a light source for generating an initial light signal; and a web medium having a plurality of separate light-transmittable zones, each of which includes;

a slot; and a light-dispersion plate secured on said slot for receiving said initial light signal and generating a multilevel light signal adapted to be sent to a light-signal processing unit in response to said initial light signal;

wherein said light-dispersion plates respectively included in said plurality of separate light-transmittable zones are made of a same material but have different thicknesses.

32. The multilevel light source device according to claim 31, wherein said light-dispersion plates are made of a material selected from a group consisting of frosted glass, plastic and acrylic plastic.

33. The multilevel light source device according to claim 31, further comprising a reflective plate arranged around said light source for enhancing intensity of said initial light signal.

34. The multilevel light source device according to claim 31, wherein said light-signal processing unit is a charge-coupled device (CCD).

35. A multilevel light source device, comprising:

a light source for generating an initial light signal; and a web medium having a plurality of separate light-transmittable zones, each of which includes:

a slot; and a light-dispersion plate made of frosted glass and secured on said slot for receiving said initial light signal and generating a multilevel light signal adapted to be sent to a light-signal processing unit in response to said initial light signal.

36. The multilevel light source device according to claim 35, wherein said light-dispersion plates have different thicknesses.

37. The multilevel light source device according to claim 35, further comprising a reflective plate arranged around said light source for enhancing intensity of said initial light source.

38. The multilevel light source device according to claim 35, wherein said light-signal processing unit is a charge-coupled device (CCD).

39. An image scanner having a multilevel light source device, comprising:

a light source for generating an initial light signal;

a web medium having a plurality of separate light-transmittable zones for receiving said initial light signal and generating a multilevel light signal in response to said initial light signal, wherein said multilevel light signal is sent to an object to be scanned to produce a scanned object light signal;

a light transmission device aligned with a first selected one of said plurality of separate light-transmittable zones for transmitting a first portion of said scanned object light signal which has passed through said first selected one of said plurality of separate light-transmittable zones for light-intensity calibration, and aligned with a second selected one of said plurality of separate light-transmittable zones for transmitting a second portion of said scanned object light signal which has passed through said second selected one of said plurality of separate light-transmittable zones for scanning; and an image sensing and processing device for receiving and processing said scanned object light signal.

* * * * *